(12) United States Patent
Yu et al.

(10) Patent No.: US 6,641,656 B2
(45) Date of Patent: Nov. 4, 2003

(54) DISPERSIONS COMPRISING MODIFIED PIGMENTS

(75) Inventors: Yuan Yu, Nashua, NH (US); Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/982,245

(22) Filed: Oct. 17, 2001

(65) Prior Publication Data
US 2003/0097958 A1 May 29, 2003

(51) Int. Cl.$^7$ ............................................... C09D 11/02
(52) U.S. Cl. ...................... 106/493; 106/31.6; 106/410; 106/413; 106/476; 106/494; 106/495; 106/496; 106/497; 106/498; 428/32.1; 428/32.18
(58) Field of Search ............................ 106/493, 410, 106/413, 476, 494, 495, 496, 497, 498, 31.6; 428/32.1, 32.18

(56) References Cited

U.S. PATENT DOCUMENTS

| | | | |
|---|---|---|---|
| 4,909,852 A | 3/1990 | Atkinson | 106/448 |
| 5,281,261 A | 1/1994 | Lin et al. | 106/20 R |
| 5,466,482 A | 11/1995 | Johnson | 427/212 |
| 5,545,504 A | 8/1996 | Keoshkerian et al. | 430/137 |
| 5,554,739 A | 9/1996 | Belmont | 534/885 |
| 5,571,311 A | 11/1996 | Belmont et al. | 106/20 |
| 5,630,868 A | 5/1997 | Belmont et al. | 106/31.75 |
| 5,698,016 A * | 12/1997 | Adams et al. | 106/31.6 |
| 5,713,988 A | 2/1998 | Belmont et al. | 106/31.6 |
| 5,714,993 A | 2/1998 | Keoshkerian et al. | 347/95 |
| 5,837,045 A * | 11/1998 | Johnson et al. | 106/31.6 |
| 5,851,280 A * | 12/1998 | Belmont et al. | 106/472 |
| 5,853,465 A | 12/1998 | Tsang et al. | 106/31.25 |
| 5,885,335 A | 3/1999 | Adams et al. | 106/316 |
| 5,886,065 A | 3/1999 | Tsang et al. | 523/161 |
| 5,891,232 A | 4/1999 | Moffatt et al. | 106/31.89 |
| 5,891,934 A | 4/1999 | Moffatt et al. | 523/161 |
| 5,895,522 A | 4/1999 | Belmont et al. | 106/31.6 |
| 5,900,029 A | 5/1999 | Belmont et al. | 8/550 |
| 5,914,806 A | 6/1999 | Gordon II et al. | 359/296 |
| 5,919,846 A | 7/1999 | Batlaw et al. | 524/83 |
| 5,922,118 A * | 7/1999 | Johnson et al. | 106/31.6 |
| 5,952,429 A | 9/1999 | Ikeda et al. | 525/326.1 |
| 5,964,935 A | 10/1999 | Chen et al. | 106/401 |
| 5,968,243 A | 10/1999 | Belmont et al. | 106/31.65 |
| 6,034,153 A | 3/2000 | Tsang et al. | 523/160 |
| 6,042,643 A | 3/2000 | Belmont et al. | 106/472 |
| 6,068,688 A | 5/2000 | Whitehouse et al. | 106/31.65 |
| 6,103,380 A | 8/2000 | Devonport | 428/403 |
| 6,150,433 A | 11/2000 | Tsang et al. | 523/160 |
| 6,214,100 B1 | 4/2001 | Parazak et al. | 106/31.6 |
| 6,221,142 B1 | 4/2001 | Wang et al. | 106/31.6 |
| 6,221,143 B1 | 4/2001 | Palumbo | 106/31.6 |
| 6,221,932 B1 | 4/2001 | Moffatt et al. | 523/160 |
| 6,235,829 B1 | 5/2001 | Kwan | 524/495 |
| 6,323,257 B1 | 11/2001 | Moffatt et al. | 523/160 |
| 6,336,965 B1 * | 1/2002 | Johnson et al. | 106/31.6 |

FOREIGN PATENT DOCUMENTS

| | | | |
|---|---|---|---|
| EP | 0 839 883 A2 | 5/1998 | C09D/11/00 |
| EP | 1 013 728 | 6/2000 | C09D/11/00 |
| EP | 1 122 286 | 8/2001 | C09D/11/00 |
| GB | 2 330 842 | 5/1999 | C09B/67/54 |
| JP | 57-21466 | 2/1982 | C09D/11/00 |
| WO | WO97/47697 | 12/1997 | C09D/11/00 |
| WO | WO99/23174 | 5/1999 | C09C/1/56 |
| WO | WO99/31175 | 6/1999 | C08K/9/04 |
| WO | WO99/51690 | 10/1999 | C09B/69/00 |
| WO | WO99/63007 | 12/1999 | C09C/1/56 |
| WO | WO00/05313 | 2/2000 | C09C/3/10 |
| WO | WO00/22051 | 4/2000 | C09C/1/56 |
| WO | WO00/43446 | 7/2000 | C08K/9/06 |
| WO | WO00/52102 | 10/2000 | C09B/67/00 |
| WO | WO00/68321 | 11/2000 | C09C/3/10 |
| WO | WO01/25340 | 4/2001 | C09B/67/20 |
| WO | WO01/30919 | 5/2001 | C09B/67/46 |
| WO | 01/51566 * | 7/2001 | |

OTHER PUBLICATIONS

JP11246806 A to Toyo Ink Mfg. Co. Ltd. Publication Date Sep. 14, 1999, Abstract Only (from Patent Abstracts of Japan).

JP11080636 A to Canon Inc., Publication Date Mar. 26, 1999, Abstract Only (from Patent Abstracts of Japan).

International Search Report for International Application No. PCT/US02/32454, mailed Jan. 21, 2003.

* cited by examiner

*Primary Examiner*—Anthony J. Green

(57) ABSTRACT

The present invention describes a dispersion comprising a vehicle and a modified pigment. The modified pigment has, when measured in an aqueous medium, a zeta potential of 0.0 mV at a pH of between 5.0 and 11.0. Inkjet ink compositions and an inkjet consumable set are also disclosed.

34 Claims, 2 Drawing Sheets

DISPERSIONS COMPRISING MODIFIED PIGMENTS

BACKGROUND OF THE INVENTION

1. Field of the Invention

The present invention relates to a dispersion comprising a vehicle and a modified pigment comprising a pigment having attached organic groups. The modified pigment has, when measured in an aqueous medium, a zeta potential of 0.0 mV at a pH of between about 5.0 and 11.0. Inkjet ink compositions and an inkjet consumable set are also disclosed.

2. Description of the Related Art

In general, pigments alone are not readily dispersible in liquid vehicles. A variety of techniques have been developed which can provide stable pigment dispersions. For example, dispersants can be added to the pigment to improve its dispersibility in a particular medium. Examples of dispersants include water-soluble polymers and surfactants. Pigment dispersions have applications in a variety of pigment-based ink compositions.

Recently, modified colored pigments have also been developed which provide ink compositions with improved properties, such as dispersibility. For-example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like.

PCT International Publication No. WO 01/51566 describes a method of making a modified pigment by reacting a first chemical group and a second chemical group to form a pigment having attached a third chemical group. The first chemical group includes at least one nucleophile and the second chemical group includes at least one electrophile, or vice versa. These pigments are used in ink compositions and, in particular, inkjet ink compositions.

While these efforts provide modified pigments with improved properties, there remains a need for improved pigment-based dispersions and ink compositions.

SUMMARY OF THE INVENTION

The present invention relates to a dispersion comprising: a) a vehicle; and b) a modified pigment comprising a pigment having attached at least two organic groups, wherein the modified pigment has, when measured in an aqueous medium, a zeta potential of 0.0 mV at a pH of between about 5.0 and about 11.0. In a preferred embodiment, the dispersion is an inkjet ink composition.

The present invention further relates to a dispersion comprising: a) a vehicle; and b) a modified pigment comprising a pigment having attached at least one organic group, wherein the organic group comprises an anionic or anionizable group and a cationic or cationizable group, and wherein the modified pigment has, when measured in an aqeuous medium, a zeta potential of 0.0 mV at a pH of between about 5.0 and about 11.0. In a preferred embodiment, the dispersion is an inkjet ink composition.

The present invention further relates to an inkjet consumable set comprising a substrate having a surface pH of between about 4.0 and 8.0 and the inkjet ink compositions described herein.

It is to be understood that both the foregoing general description and the following detailed description are exemplary and explanatory only and are intended to provide further explanation of the present invention, as claimed.

DETAILED DESCRIPTION OF THE INVENTION

Figure 1:
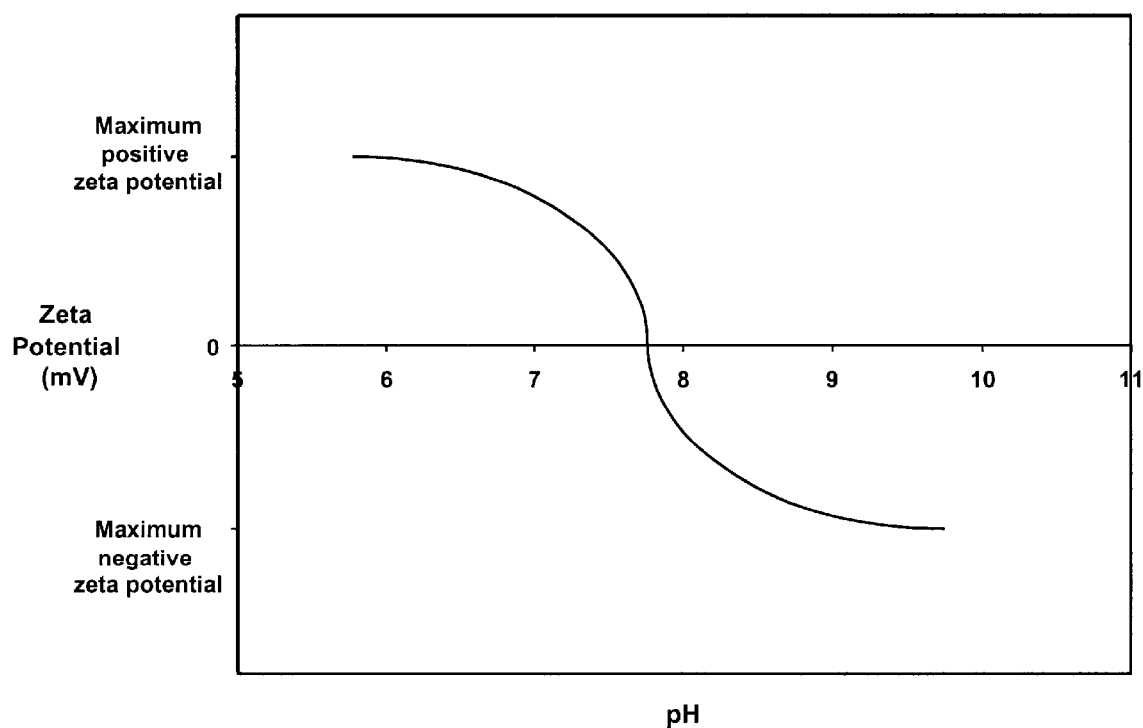
FIG. 1 is a plot showing the general effect of pH on the zeta potential of a dispersion comprising a modified pigment, as described herein.

The present invention relates to a dispersion comprising a vehicle and a modified pigment. The modified pigment, when measured in an aqueous medium, has a zeta potential of 0.0 within a defined pH range.

The dispersions of the present invention comprise a vehicle and a modified pigment. The vehicle can be either an aqueous or non-aqueous liquid vehicle, but is preferably a vehicle that contains water. Thus, the vehicle is preferably an aqueous vehicle, which can be, for example, water or mixtures of water with water miscible solvents such as alcohols. Preferably the aqueous vehicle is water, and the dispersion is an aqueous dispersion.

The dispersions of the present invention also comprise a modified pigment. The modified pigment comprises a pigment having an attached organic group. The pigment can be any type of pigment conventionally used by those skilled in the art, such as black pigments and other colored pigments. Mixtures of different pigments can also be used.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Colombian Chemical Corporation) and MA100 and MA440 available from Mitsubishi Chemical Corporation.

The pigment may also be chosen from a wide range of conventional colored pigments. The colored pigment can be blue, black, brown, cyan, green, white, violet, magenta, red, orange, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

Other examples of pigments include Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), Normandy Magenta RD-2400, Paliogen Violet 5100, Paliogen® Violet 5890, Permanent Violet VT2645, Heliogen Green L8730, Argyle Green XP-111-S, Brilliant Green Toner GR 0991, Heliogen® Blue L6900, L7020, Heliogen® Blue D6840, D7080, Sudan Blue OS, PV Fast Blue B2GO1, Irgalite Blue BCA, Paliogen® Blue 6470, Sudan III, Sudan II, Sudan IV, Sudan Orange G, Sudan Orange 220, Paliogen® Orange 3040, Ortho Orange OR 2673, Paliogen® Yellow 152, 1560, Lithol Fast Yellow 0991K, Paliotol Yellow 1840, Novoperm® Yellow FG 1, Permanent Yellow YE 0305, Lumogen Yellow D0790, Suco-Gelb L1250, Suco-Yellow D1355, Hostaperm® Pink E, Fanal Pink D4830, Cinquasia Magenta, Lithol Scarlet D3700, Toluidine Red, Scarlet for Thermoplast NSD PS PA, E.D. Toluidine Red, Lithol Rubine Toner, Lithol Scarlet 4440, Bon Red C, Royal Brilliant Red RD-8192, Oracet Pink RF, Paliogen® Red 3871K, Paliogen® Red 3340, and Lithol Fast Scarlet L4300. These are available from sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson, Coleman, Bell.

The pigment can have a wide range of BET surface areas, as measured by nitrogen adsorption. Preferably, the pigment has a surface area greater than or equal to 85 $m^2/g$, and more preferably greater than or equal to about 100 $m^2/g$, thereby corresponding to a smaller primary/aggregate particle size. Such surface areas have been found to provide for a more uniform distribution and efficient level of treating agent on the pigment and a higher percent yield of the modified pigment after post processing techniques. If the preferred higher surface area of the pigment (thereby corresponding to a smaller particle size) is not readily available, it is well recognized by those skilled in the art that the pigment may be subject to conventional size comminution or reduction techniques, such as ball or jet milling, to reduce the pigment to the desired particle size.

In a first embodiment of the present invention, the dispersion comprises a modified pigment having attached at least two organic groups. By at least two organic groups is meant two types of organic groups—organic group A and organic group B. These groups can be attached to the pigment in any order. Each organic group A and B comprise at least one ionic group, ionizable group, or mixture of an ionic group and an ionizable group. An ionic group is either anionic or cationic and is associated with a counterion of the opposite charge including inorganic or organic counterions such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Anionizable groups form anions and cationizable groups form cations. Organic ionic groups include those described in U.S. Pat. No. 5,698,016, the description of which is fully incorporated herein by reference.

Organic group A preferably comprises at least one anionic or anionizable group. Anionic groups are negatively charged ionic groups that may be generated from groups having ionizable substituents that can form anions (anionizable groups), such as acidic substituents. They may also be the anion in the salts of ionizable substituents. Preferably, when the ionizable substituent forms an anion, the ionizable substituent has a $pK_a$ of less than 11. The anionic group could further be generated from a species having ionizable groups with a $pK_a$ of less than 11 and salts of ionizable substituents having a $pK_a$ of less than 11. The $pK_a$ of the ionizable substituent refers to the $pK_a$ of the ionizable substituent as a whole, not just the acidic substituent. More preferably, the $pK_a$ is less than 10 and most preferably less than 9.

Representative examples of anionic groups include $—COO^-$, $—SO_3^-$, $—SO_3^-$, $—OSO_3^-$, $—HPO_3^-$, $—OPO_3^{-2}$, and $PO_3^{-2}$. Representative examples of anionizable groups include $—COOH$, $—SO_3H$, $—PO_3H_2$, $—R'SH$, $—R'OH$, and $—SO_2NHCOR'$, where R' represents hydrogen or an organic group such as a substituted or unsubstituted aryl and/or alkyl group. Preferably, the anionic or anionizable group is a carboxylic acid group, a sulfonic acid group, a phoshonic acid group, or salts thereof.

Organic group B preferably comprises at least one cationic or cationizable group. Cationic groups are positively charged organic ionic groups that may be generated from ionizable substituents that can form cations (cationizable groups), such as protonated amines. For example, alkyl or aryl amines may be protonated in acidic media to form ammonium groups $—NR'_2H^+$, where R' represent an organic group such as a substituted or unsubstituted aryl and/or alkyl group. Preferably, the amine has a $pK_b$ of less than 5. Cationic groups may also be positively charged organic ionic groups. Examples include quaternary ammonium groups ($—NR'_3^+$) and quaternary phosphonium groups ($—PR'_3^+$). Here, R' represents hydrogen or an organic group such as a substituted or unsubstituted aryl and/or alkyl group. Preferably, the cationic or cationizable group is an amine group or a salt thereof.

Organic group A and organic group B may, independently, also be polymeric groups. Preferably, the polymeric groups comprise the ionic or ionizable groups described above. Thus, organic group A may be a polymeric group comprising one or more anionic or anionizable groups. Examples include, but are not limited to, polyacids such as polyacrylic acid, polymethacrylic acid, copolymers of acrylic acid or methacrylic acid, including styrene-acrylic acid polymers, and hydrolyzed derivatives of maleic anhydride-containing polymers. Organic group B may also be a polymeric group comprising one or more cationic or cationizable groups. Examples include, but are not limited to, linear or branched polyamines such as polyethyleneimine (PEI), oligomers of ethyleneimine (such as pentaethyleneamine, PEA) and derivatives of polyethyleneimine.

For example, organic group A and organic group B may be groups represented by the formula —X—Sp—[Polymer]R. X, which is directly attached to the pigment, represents an arylene or heteroarylene group or an alkylene group and is substituted with an Sp group. Sp represents a spacer group. The group Polymer represents a polymeric group comprising repeating monomer groups or multiple monomer groups or both. R represents hydrogen, a bond, a substituted or unsubstituted alkyl group, or a substituted or unsubstituted aryl group. Preferably, at least one type of monomer group comprises at least one ionic or ionizable group. Thus, preferably for organic group A, at least one type of monomer comprises an anionic or anionizable group and, for organic group B, at least one type of monomer comprises a cationic or cationizable group. The group Polymer can be further substituted with additional groups. The total number of monomer repeating units that comprise the "polymer" is preferably not greater than about 500 monomer repeating units.

The group Polymer can be any type of polymeric group such as, for example, a thermoplastic polymeric group or a thermosetting polymeric group. Further, the polymeric group can be a homopolymer, copolymer, terpolymer, and/or a polymer containing any number of different repeating units. Further, the group Polymer can be a random polymer, alternating polymer, graft polymer, block polymer, star-like polymer, and/or comb-like polymer. Preferred examples of the group Polymer are those described above.

The group Sp represents a spacer group which, as used herein, is a link between two groups. The group Sp can be a bond or a chemical group. Examples of chemical groups include, but are not limited to, —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR$—, —O—, —S—, —NR—, —NRCO—, —CONR—, —$NRCO_2$—, —$O_2CNR$—, —NRCONR—, —NRCOCH($CH_2CO_2R$)—, —NRCOCH$_2$CH(CO$_2$R)—, —N(COR)(CO)—, imide groups, arylene groups, alkylene groups and the like. R, which can be the same or different, represents hydrogen or an organic group such as a substituted or unsubstituted aryl or alkyl group.

The group X represents an arylene or heteroarylene group or an alkylene group. X is directly attached to the pigment and is further substituted with an Sp group. The aromatic group can be further substituted with any group, such as one or more alkyl groups or aryl groups. Preferably, the arylene group is phenylene, naphthylene, or biphenylene, and the heteroarylene group. When X represents an alkylene group, examples include, but are not limited to, substituted or unsubstituted alkylene groups which may be branched or unbranched. The alkylene group can be substituted with one or more groups, such as aromatic groups. Examples include, but are not limited to, $C_1$–$C_{12}$ groups like methylene, ethylene, propylene, or butylene, groups. Preferably, X is an arylene group.

The group X may be substituted with one or more functional groups. Examples of functional groups include, but are not limited to, R''', OR''', COR''', COOR''', OCOR''', carboxylates, halogens, CN, NR'''$_2$, SO$_3$H, sulfonates, sulfates, NR'''(COR'''), CONR'''$_2$, NO$_2$, PO$_3$H$_2$, phosphonates, phosphates, N=NR''', SOR''', NSO$_2$R''', wherein R''' which can be the same or different, is independently hydrogen, branched or unbranched $C_1$–$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As shown by the structure above, the group Polymer is attached to the pigment through the spacer group Sp. However, it will also be recognized that when R represents a bond, the available bond can also be attached to the pigment. In addition, the group Polymer can also be attached to the pigment at multiple points along the polymer chain through proper choice of substituent groups on the repeating monomer units. These substituents may also comprise spacer groups or —X—Sp— groups as described above. Thus, these groups can be attached to the pigment at either end or at points along the backbone. Further, these groups can be any type of polymeric group, such as a random polymer, alternating polymer, graft polymer, block polymer, star-like polymer, and/or comb-like polymer.

For this first embodiment, the modified pigments used in the dispersions of the present invention are modified using methods known to those skilled in the art such that organic groups are attached to the pigment. For example, the modified pigments used in the dispersions of the present invention can be prepared using the methods described in U.S. Pat. Nos. 5,851,280, 5,698,016, 5,922,118, and 5,837,045, and PCT Publication Nos. WO 99/51690 and WO 00/22051, the descriptions of which are fully incorporated herein by reference. This provides a more stable attachment of the groups on the pigment compared to adsorbed groups, such as polymers, surfactants, and the like.

In this embodiment, the amount of each of the attached organic groups can be varied in order to attain the desired performance attributes, which are described below. Thus, for example, the amount of organic group A and organic group B can be any amount which produces a modified pigment having, when measured in an aqueous medium, a zeta potential of 0.0 mV within a pH range of between about 5.0 and 11.0.

In a second embodiment of the present invention, the dispersion comprises a modified pigment having attached at least one organic group comprising at least one anionic or anionizable group and at least one cationic or cationizable group. In this embodiment, both an anionic or anionizable group as well as a cationic or cationizable group are present on the same organic group. The anionic or anionizable group and cationic or cationizable group are the same as those described above. Preferably, the anionic or anionizable group is a carboxylic acid group, a sulfonic acid group, a phosphonic acid group, or salts thereof. The cationic or cationizable group preferably is an amine group or salt thereof. The organic group may also be polymeric. Thus, the organic group may be a polymer group comprising cationic or cationizable groups and further comprising anionic or anionizable groups.

Preferably the organic group comprises the reaction product of at least one organic group A comprising at least one anionic or anionizable group and at least one organic group B comprising at least one cationic or cationizable group. Organic group A and organic group B are as described above.

For this second embodiment, the modified pigments used in the dispersions of the present invention can be prepared using methods known to those skilled in the art such that organic groups are attached to the pigment. For example, the modified pigments may be prepared using the method described in PCT Publication No. WO 01/51566, which is incorporated in its entirety herein by reference. Following this method, the groups may be reacted in any order. It is preferred that one group be attached to the pigment prior to the reaction with the second group. Thus, for example, organic group A may be reacted with organic group B which is attached to the pigment, and vice-versa.

In this second embodiment, the amount of anionic or anionizable groups and cationic or cationizable groups can be varied in order to attain the desired performance attributes, which are described below. Thus, for example, the amount the anionic or anionizable group and cationic or cationizable group can be any amount that produces a modified pigment having, when measured in an aqueous medium, a zeta potential of 0.0 mV within a pH range of between about 5.0 and 11.0.

When the attached organic group comprises the reaction product of at least one organic group A comprising at least one anionic or anionizable group and at least one organic group B comprising at least one cationic or cationizable group, the mole ratio of organic group A relative to organic group B can also be varied. The molar amounts of each group can be measured using any technique known in the art including, for example, titration and elemental analysis. It is preferred that the organic group has a mole ratio of anionic or anionizable groups to cationic or cationizable groups of less than 1 when organic group B is attached to the pigment. More preferably, the mole ratio of anionic or anionizable groups to cationic or cationizable groups is less than 0.75 and most preferably is less than 0.50. Thus, the molar amount of anionic or anionizable groups is less than the molar amount of cationic or cationizable groups when organic group B is attached to the pigment. Additionally, it is preferred that the organic group has a mole ratio of cationic or cationizable groups to anionic or anionizable groups of less than 1 when organic group A is attached to the pigment. More preferred is a mole ratio of less than 0.75, and most preferred is a mole ratio of less than 0.50. Thus, when organic group A is attached to the pigment, the molar amount of cationic or cationizable groups is less than the molar amount of anionic or anionizable groups. However, regardless of how the modified pigment is prepared, the amount of attached organic group is such that the resulting modified pigment has, when measured in an aqueous medium, a 0.0 mV zeta potential within the pH ranges recited below.

A particularly preferred organic group is one that comprises the reaction product of an amine-containing polymeric group (organic group A) and a cyclic anhydride (organic group B). Most preferred is where the amine-containing polymer is attached to the pigment. The amine-containing polymer is preferably polyethyleneimine (PEI), oligomers of ethyleneimine (such as pentaethylenenamine, PEA) or a derivative or polyethyleneimine. The anhydride is preferably a substituted or unsubstituted aromatic or aliphatic cyclic anhydride, in particular succinic anhydride.

As stated previously, the present invention relates to dispersions comprising a vehicle and a modified pigment. For both of the embodiments of the present invention described above, in general, the total amount of attached organic groups is from about 0.01 to about 10.0 micromoles of organic group/$m^2$ surface area of pigment, as measured by nitrogen adsorption (BET method). For example, the amount of attached organic groups is between from about 0.5 to about 4.0 micromoles/$m^2$. In addition, the modified pigments may further comprise additional attached organic groups. This can result in further improved properties.

The modified pigments may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art.

The dispersions may also be purified or classified to remove impurities and other undesirable free species which can co-exist in the dispersion as a result of the manufacturing process. For example, the dispersion can be purified to remove any undesired free species, such as unreacted treating agent. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, and $Br^-$.

The dispersions can be formed with a minimum of additional components (additives and/or cosolvents) and processing steps. However, additives such as surfactants and cosolvents may also be included.

The dispersions of the present invention comprise modified pigments having, when measured in an aqueous medium, a zeta potential of 0.0 mV within a pH range of between about 5.0 and 11.0. Zeta potential is the potential difference between the shear plane and the bulk of the liquid beyond the electric double layer near the surface of a particle. Zeta potential cannot be measured directly, but can be calculated from a variety of techniques known in the art. For example, a dispersion of particles in a solution containing an electrolyte can be placed between charged electrodes, and the zeta potential of the particles can then be calculated from its measured electrophoretic mobility. For a more complete discussion of zeta potentials, please see R. J. Hunter, *Zeta Potential in Colloid Science* (Academic Press, 1981).

The zeta potential of a particle, such as the modified pigment, is dependent on several factors including pH. For example, as the pH of a dispersion containing a particle is changed, the zeta potential of the particle increases negatively or positively, depending on its surface chemistry. Eventually, the zeta potential will approach an asymptote at a maximum negative or positive value. This maximum zeta potential is the point at which the value no longer changes with pH.

A particle may also have a zeta potential of 0.0 mV. The point at which a particle has a net zero zeta potential, often referred to as the isoelectric point, is dependent on pH as well as the characteristics of the particle surface. Thus, for example, as the pH of a dispersion containing a particle is changed, the surface charge can become neutralized to the point at which no net charge is present.

The dispersions of the present invention, comprising a vehicle and a modified pigment have, when measured in an aqueous medium, a zeta potential of 0.0 mV at a pH of between about 5.0 and about 11.0. The aqueous medium may be any medium containing water which is useful for measuring zeta potentials. Typically, the aqueous medium contains water soluble salts such as KCl. Preferably, the modified pigments have a 0.0 mV zeta potential at a pH of between about 6.0 and about 10.0, and more preferably between about 8.0 and 10.0.

In a preferred embodiment, the modified pigments used in the dispersions of the present invention further have a maximum zeta potential of ±50 mV, and more preferably ±35 mV. Thus, as the pH of the dispersion is increased (or decreased), the zeta potential value approaches this maximum value and then does not change with further increases (or decreases) in pH. In a further preferred embodiment, the modified pigments have a maximum negative zeta potential of between 0.0 and −35.0 mV at a pH greater than about 6.0 and a maximum positive zeta potential of between 0.0 and +35.0 mV at a pH less than about 10.0.

It has been found that the modified pigments used in the dispersions of the present invention as described herein have a negative zeta potential at high pH and a positive zeta potential at low pH. Thus, for example, it has been found that the modified pigments have a maximum negative zeta potential under alkaline conditions and, as the pH is lowered, reach a zeta potential of 0.0 mV at a pH between about 5.0 and about 11.0. As the pH is further decreased, the dispersion reaches a maximum positive zeta potential under acidic conditions. This effect is further illustrated in FIG. 1. These modified pigments have been found to be dispersible at high or low pH but not dispersible at an intermediate pH, thus providing improved performance in ink compositions.

The present invention further relates to inkjet ink compositions comprising a liquid vehicle and a modified pigment. The modified pigment is as described above for the dispersions of the present invention and comprise a pigment having attached organic groups. The modified pigment has, when measured in an aqueous medium, a zeta potential of 0.0 mV at a pH of between about 5.0 and about 11.0

In general, an ink composition consists of a vehicle, which functions as a carrier, and a colorant such as a dye or pigment. Additives and/or cosolvents can be incorporated in order to adjust the ink to attain the desired performance. The vehicle for the inkjet ink compositions of the present invention may be either an aqueous or a non-aqueous vehicle. Preferably, the vehicle is an aqueous vehicle and the inkjet ink composition is an aqueous inkjet ink composition.

The inkjet ink compositions of the present invention can be formed with a minimum of additional components (additives and/or cosolvents) and processing steps. The modified pigments are the same as were described above and are present in the inkjet ink compositions in an amount effective to provide the desired image quality (for example, optical density) without detrimentally affecting the performance of the inkjet ink. For example, typically, the modified pigment will be present in an amount ranging from about 0.1% to about 20% based on the weight of the ink. It is also within the bounds of the present invention to use a formulation containing a mixture of the modified pigments described herein and unmodified pigments, other modified pigments, or both.

Suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40%.

Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink compositions can be purified and/or classified using methods such as those described above for the modified pigments and dispersions thereof. An optional counterion exchange step can also be used. In this way, unwanted impurities or undesirable large particles can be removed to produce an ink with good overall properties.

The present invention further relates to an inkjet consumable set comprising a substrate and an inkjet ink composition. The inkjet ink composition is as described above and comprises a liquid vehicle and modified pigment having attached organic groups. The modified pigment has, when measured in an aqueous medium, a zeta potential of 0.0 mV at a pH of between about 4.0 and about 11.0. In the inkjet consumable set, the inkjet ink composition may be applied using any inkjet printing process known in the art, such as thermal, piezoelectric, and continuous inkjet printing.

The substrate can be any suitable substrate to which the ink can be applied. Examples include paper, coated or laminated paper, card stock, transparent film, textile, or plastic. Preferably, the substrate has a surface pH of between about 4.0 and about 8.0.

A preferred inkjet consumable set of the present invention is one in which the surface pH of the substrate falls within the pH range at which the modified pigment of the inkjet ink composition has a zeta potential of 0.0 mV. By applying an inkjet ink composition of the present invention to a substrate with such a surface pH, improved print properties result, such as optical density, smear fastness, and bleed control. More preferably, the surface pH of the substrate and the pH at which the modified pigment of the inkjet ink composition has a zeta potential of 0.0 mV, differ by no more than 2. Thus, in essence, the isoelectric point of pigment in the ink composition is near the surface pH of the substrate.

The present invention will be further clarified by the following examples which are intended to be only exemplary in nature.

EXAMPLES

Examples 1–4

The following general procedure was used for preparing the dispersions of Examples 1–4. The amounts of reagents used for each example are shown in Table 1 below.

TABLE 1

| Example | Amount of PEI-1200-modified pigment dispersion (g) | Amount of 1 M NaOH (g) | Amount of succinic anhydride (mg) | Amount of Additional DI water (g) |
| --- | --- | --- | --- | --- |
| 1 | 13.33 | 0.32 | 16 | 6.2 |
| 2 | 13.33 | 0.82 | 41 | 5.8 |
| 3 | 13.33 | 1.6 | 82 | 5 |
| 4 | 13.33 | 3.2 | 163 | 3.5 |
| Comp. Ex. 1 | 13.33 | 8.2 | 408 | 0 |

An aqueous dispersion of a polyethyleneimine (PEI)-modified pigment was prepared according to the procedure described in Example 4 of PCT Publication No. WO 01/51566. In particular, the APSES-treated carbon black described in Example B of PCT Publication No. WO 01/51566 was prepared from Black Pearls® 700 carbon black (available from Cabot Corporation) and aminophenyl-(2-(sulfatoethyl)-sulfone. The APSES-treated carbon black was then added to an aqueous solution of polyethylenenimine (PEI) with a MW of 1200 (PEI-1200, available from BASF Cooperation, Charlotte, N.C.), as further described in Example 4. The resulting PEI-1200 modified pigment had an attached nitrogen level of 1.7 mmol/g. Assuming all of the nitrogen groups were amine groups, 1.7 mmol/g of amine groups were present on the modified pigment.

A 15% solids aqueous dispersion of the PEI-1200 modified pigment was prepared, and to this was added 1 M NaOH all in one portion. The mixture was allowed to stir for about 1 hour. Various amounts of succinic anhydride (available from Aldrich Chemical, Milwaukee, Wis.) were then added in small portions over 10 minutes. An additional amount of deionized water was added to dilute the solids content of the modified pigment to approximately 10%. The resultant mixture was allowed to stir overnight. The crude product was then purified by diafiltration (diafiltration module had 0.05 micron rating and available from Spectrum Lab, Rancho Dominguez, Calif.) using first 10 volumes of 0.1 M NaOH and then 20 volumes of deionized water.

The dispersion of Comparative Example 1 was prepared according to the procedures described in PCT Publication No. WO 01/51566 using the same starting materials as Examples 1–4 of the present invention with the amounts of reagents shown in Table 1.

The molar amounts of amine groups and succinic anhydride groups, as well as the mole ratio of succinic anhydride groups to amine groups, is shown below in Table 2.

TABLE 2

| Example | mmol of amine groups | mmol of succinic anhydride groups | mole ratio of succinic anhydride groups to amine groups |
| --- | --- | --- | --- |
| 1 | 3.4 | 0.16 | 0.05 |
| 2 | 3.4 | 0.41 | 0.12 |
| 3 | 3.4 | 0.82 | 0.24 |
| 4 | 3.4 | 1.63 | 0.48 |
| Comp. Ex. 1 | 3.4 | 4.08 | 1.20 |

The properties of the dispersions of Examples 1–4 and Comparative Example 1 were measured. The mean volume particle size determined by dynamic light scattering method using MICROTRAC® Ultrafine Particle Analyzer (available from Honeywell, Minneapolis, Minn.) in either deionized water or pH buffer solutions. Zeta potential was determined by electrophoresis using a Zeta Plus Zeta Potential Analyzer (available from Brookhaven Instrument Corp. in Holtsville, N.Y.) in 1 mM of KCl for pH less than 6, higher pH solutions were prepared by adding small amount of 1 M NaOH into 1 mM KCl solution. The results are shown in Table 3 and FIG. 2.

TABLE 3

| Example | Mean volume particle size (nm) | Zeta Potential vs pH | | | | | |
| --- | --- | --- | --- | --- | --- | --- | --- |
| 1 | 135 (in DI-water) | pH | 5.55 | 8.66 | 9.18 | 9.81 | 10.32 |
| | | Zeta Potential (mV) | 32 | 24 | 11 | −6 | −15 |
| 2 | 133 (in DI-water) | pH | 5.7 | 8.56 | 9.03 | 9.43 | 9.98 |
| | | Zeta Potential (mV) | 32 | 6 | −4 | −10 | −23 |
| 3 | 130 (in DI-water) | pH | 5.3 | 7.9 | 8.8 | 9.56 | — |
| | | Zeta Potential (mV) | 29 | 7 | −14 | −25 | — |
| 4 | 139 (in pH 10 buffer) | pH | 5.7 | 6.3 | 7.5 | 9.03 | 10.11 |
| | | Zeta Potential (mV) | 22 | −3 | −18 | −27 | −29 |
| Comp Ex 1 | 140 (in DI-water) | pH | 5.5 | — | — | — | — |
| | | Zeta Potential (mV) | −30 | — | — | — | — |

Figure 2:
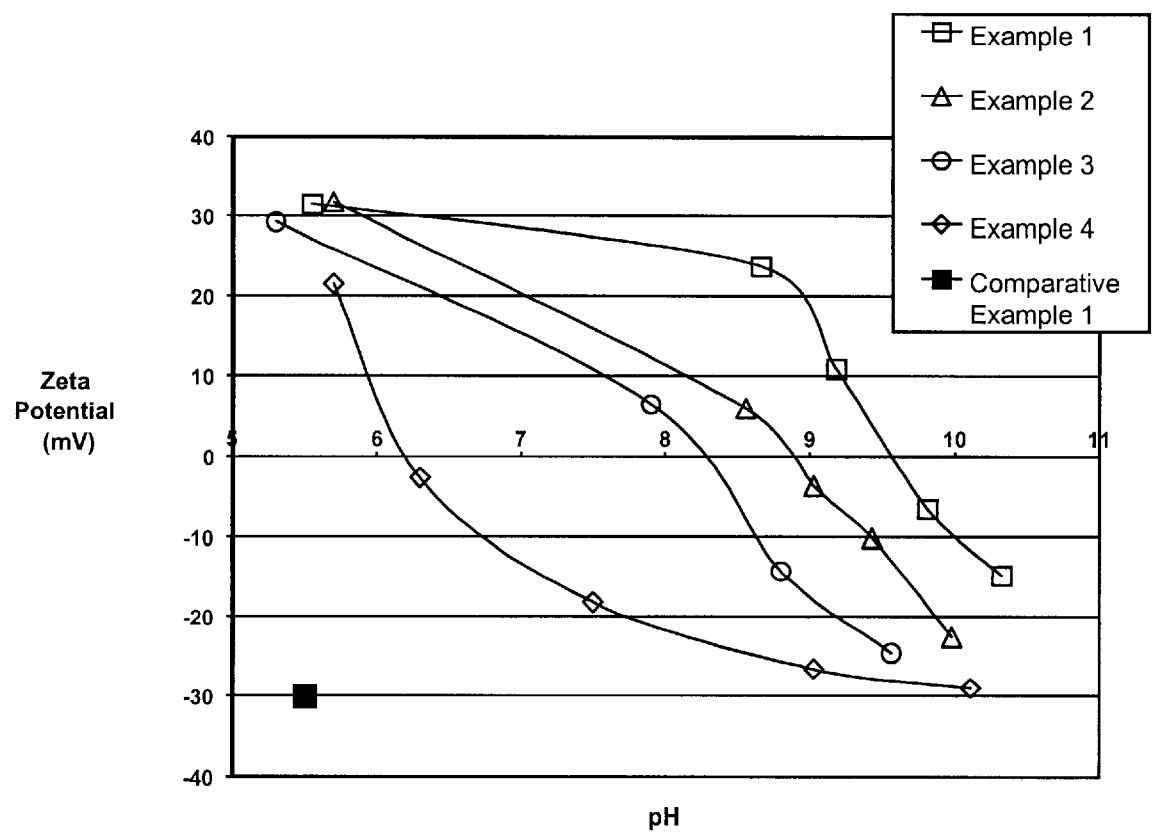
FIG. 2 is a plot showing the effect of pH on the zeta potential of the dispersions of the present invention described in Examples 1–4, as well as Comparative Example 1.

The results in Table 3 and FIG. 2 show that as the input level of succinic anhydride is varied, the isoelectric point of the final dispersions falls within a pH range of about 6 and about 10. Maximum zeta potentials of these dispersions are ±35 mV. The zeta potential is negative at higher pH's and positive at lower pH's. For Comparative Example 1, the dispersion had zeta potential of −30 mV at a pH of 5.5. Therefore, the pH at which the zeta potential of this pigment would be 0.0 mV would be approximately 4.

The dispersions of Examples 1–4 were found to have unique zeta potential properties over those of Comparative Example 1 and are expected to yield improved performance properties in the particular end use applications. For example, aqueous inkjet ink compositions prepared using the dispersions of the present invention are expected to have improved optical density, smear fastness, and bleed control when jetting onto a substrate having a surface pH of between about 4.0 and 8.0.

Thus, the dispersions of the present invention may be useful in a wide variety of aqueous and non-aqueous applications in which control over the zeta potential of the pigment is needed. This is particularly true for inkjet ink compositions, in which the isoelectric point of the pigment is near the surface pH of the substrate.

What is claimed is:

1. A dispersion comprising: a) a vehicle; and b) a modified pigment comprising a pigment having attached at least two organic groups, wherein the modified pigment has, when measured in an aqueous medium, a zeta potential of 0.0 mV at a pH of between about 5.0 and about 11.0.

2. The dispersion of claim 1, wherein the modified pigment has a zeta potential of 0.0 mV at a pH of between about 6.0 and about 10.0.

3. The dispersion of claim 2, wherein the modified pigment has a zeta potential of 0.0 mV at a pH of between about 8.0 and about 10.0.

4. The dispersion of claim 1, wherein the modified pigment has attached, in any order, at least one organic group A comprising at least one anionic or anionizable group and at least one organic group B comprising at least one cationic or cationizable group.

5. The dispersion of claim 4, wherein the anionic or anionizable group is a carboxylic acid group, a sulfonic acid group, a phosphonic acid group, or salts thereof.

6. The dispersion of claim 4, wherein the cationic or cationizable group is an amine group or salts thereof.

7. The dispersion of claim 1, wherein the modified pigment further has a maximum zeta potential of ±50.0 mV.

8. The dispersion of claim 7, wherein the modified pigment further has a maximum zeta potential of ±35.0 mV.

9. The dispersion of claim 1, wherein the modified pigment further has a maximum negative zeta potential of between 0.0 and −35.0 mV at a pH greater than about 6.0 and a maximum positive zeta potential of between 0.0 and +35.0 mV at a pH less than about 10.0.

10. The dispersion of claim 1, wherein the pigment is a blue pigment, a black pigment, a brown pigment, a cyan pigment, a green pigment, a white pigment, a violet pigment, a magenta pigment, a red pigment, an orange pigment, a yellow pigment, or mixtures thereof.

11. The dispersion of claim 1, wherein the pigment is carbon black.

12. The dispersion of claim 1, wherein the liquid vehicle is an aqueous vehicle.

13. The dispersion of claim 1, wherein the dispersion is an inkjet ink composition.

14. A dispersion comprising: a) a vehicle; and b) a modified pigment comprising a pigment having attached at least one organic group, wherein the organic group comprises at least one anionic or anionizable group and at least one cationic or cationizable group, and wherein the modified pigment has, when measured in an aqueous medium, a zeta potential of 0.0 mV at a pH of between about 5.0 and about 11.0.

15. The dispersion of claim 14, wherein the modified pigment has a zeta potential of 0.0 mV at a pH of between about 6.0 and about 10.0.

16. The dispersion of claim 15, wherein the modified pigment has a zeta potential of 0.0 mV at a pH of between about 8.0 and about 10.0.

17. The dispersion of claim 14, wherein the organic group comprises the reaction product of at least one organic group A comprising at least one anionic or anionizable group and at least one organic group B comprising at least one cationic or cationizable group.

18. The dispersion of claim 17, wherein the organic group has a mole ratio of anionic or anionizable groups to cationic or cationizable groups of less than 1, and wherein organic group B is attached to the pigment.

19. The dispersion of claim 17, wherein the organic group has a mole ratio of cationic or cationizable groups to anionic or anionizable groups of less than 1, and wherein organic group A is attached to the pigment.

20. The dispersion of claim 14, wherein the anionic or anionizable group is a carboxylic acid group, a sulfonic acid group, a phosphonic acid group, or salts thereof.

21. The dispersion of claim 14, wherein the cationic or cationizable is an amine group or salts thereof.

22. The dispersion of claim 17, wherein organic group A is polyethyleneimine and organic group B is a substituted or unsubstituted aromatic or aliphatic cyclic anhydride.

23. The dispersion of claim 22, wherein the aliphatic cyclic anhydride is succinic anhydride.

24. The dispersion of claim 14, wherein the modified pigment further has a maximum zeta potential of ±50.0 mV.

25. The dispersion of claim 24, wherein the modified pigment further has a maximum zeta potential of ±35.0 mV.

26. The dispersion of claim 14, wherein the modified pigment further has a maximum negative zeta potential of between 0.0 and −35.0 mV at a pH greater than about 6.0 and a maximum positive zeta potential of between 0.0 and +35.0 mV at a pH less than about 10.0.

27. The dispersion of claim 14, wherein the pigment is a blue pigment, a black pigment, a brown pigment, a cyan pigment, a green pigment, a white pigment, a violet pigment, a magenta pigment, a red pigment, an orange pigment, a yellow pigment, or mixtures thereof.

28. The dispersion of claim 14, wherein the pigment is carbon black.

29. The dispersion of claim 14, wherein the liquid vehicle is an aqueous vehicle.

30. The dispersion of claim 14, wherein the dispersion is an inkjet ink composition.

31. An inkjet consumable set comprising:
   (i) a substrate having a surface pH of between about 4.0 and about 8.0; and
   (ii) an inkjet ink composition comprising: a) a liquid vehicle; and b) a modified pigment comprising a pigment having attached at least two organic groups, wherein the modified pigment has, when measured in an aqueous medium, a zeta potential of 0.0 mV at a pH of between about 4.0 and about 11.0.

32. The inkjet consumable set of claim 31, wherein the surface pH of the substrate and the pH at which the modified pigment has a zeta potential of 0.0 mV differ by no more than 2.

33. An inkjet consumable set comprising:
   (i) a substrate having a surface pH of between about 4.0 and about 8.0; and
   (ii) an inkjet ink composition comprising: a) a liquid vehicle; and b) a modified pigment comprising a pigment having attached at least one organic group, wherein the organic group comprises an anionic or anionizable group and a cationic or cationizable group, and wherein the modified pigment has, when measured in an aqueous medium, a zeta potential of 0.0 mV at a pH of between about 4.0 and about 11.0.

34. The inkjet consumable set of claim 33, wherein the surface pH of the substrate and the pH at which the inkjet ink composition has a zeta potential of 0.0 mV differ by no more than 2.

* * * * *